TRIAXIAL FABRIC

Original Filed April 23, 1968 7 Sheets-Sheet 1

INVENTOR.
Norris Fitz Dow

TRIAXIAL FABRIC

Original Filed April 23, 1968 7 Sheets-Sheet 2

INVENTOR:
NORRIS FITZ DOW,
BY Paul E. Prestia
ATTORNEY

TRIAXIAL FABRIC

Original Filed April 23, 1968 7 Sheets-Sheet 3

INVENTOR.
Norris Fitz Dow

INVENTOR.
Norris Fitz Dow

INVENTOR.
Norris Fitz Dow

TRIAXIAL FABRIC

Original Filed April 23, 1968 7 Sheets-Sheet 6

INVENTOR.
Norris Fitz Dow

TRIAXIAL FABRIC

Original Filed April 23, 1968 7 Sheets-Sheet 7

INVENTOR:
NORRIS FITZ DOW,
BY Paul F. Prestia
ATTORNEY

United States Patent Office

Re. 28,155
Reissued Sept. 10, 1974

28,155
TRIAXIAL FABRIC

Norris F. Dow, Radnor, Pa., assignor to Doweave, Inc.

Original No. 3,446,251, dated May 27, 1969, Ser. No. 725,585, Apr. 23, 1968, which is a continuation-in-part of abandoned application Ser. No. 515,028, Dec. 20, 1965. Application for reissue June 18, 1973, Ser. No. 370,946

Int. Cl. D03d *13/00*

U.S. Cl. 139—383 R 23 Claims

Matter enclosed in heavy brackets [ ] appears in the original patent but forms no part of this reissue specification; matter printed in italics indicates the additions made by reissue.

ABSTRACT OF THE DISCLOSURE

Fabrics of this invention comprise three angularly displaced sets of parallel courses of yarn, interwoven to prevent slippage of at least one yarn course set along any other yarn course set. The interweaving may be such as to prevent slippage of all three yarn course sets. Each yarn course may comprise one or more individual strands of yarn. Fabrics woven in this manner are substantially isotropic, i.e. their strength and resistance to stretching or shearing forces in a plane of the fabric is relatively constant regardless of the direction of force application.

Introduction

This application is a continuation-in-part of application Ser. No. 515,028, filed Dec. 20, 1965, now abandoned, of common inventorship and assignment herewith.

The present invention relates to a triaxial woven fabric having three sets of parallel yarn courses arranged at angles to each other. More particularly this invention relates to triaxial woven fabrics having strength and stiffness on the bias as well as in other directions.

Background of the invention

Conventional single ply woven fabrics are characterized by the presence of a combination of two basic yarns in the weave—the warp and the weft or filling. They have maximum strength along the warp and along the filling but have inherent weakness on the bias. This lack of sufficient "shear strength" limits the usefulness of conventional woven fabrics for many applications. Attempts to overcome this problem have taken the direction of adding plys of woven fabric together in such manner that the bias direction in one ply is reinforced by an adjacent ply oriented with its bias direction at an angle to that of the other fabric. However, this requires an increase in weight and bulk of the resultant fabric.

Triaxial fabrics have appeared in printed publications; an example appears in the patent to Stewart No. 1,368,215 granted February 8, 1921. The Stewart fabric is composed of two sets of diagonal warps arranged at two different axes and doubled weft rows arranged along still another axis, and is characterized by the fact that every warp yarn of one set is laid over every warp yarn of the other set. Further, each weft yarn is woven in the same way as its companion. The product is considered to be lacking in shear strength and transverse strength (strength in a direction normal to the filling yarns) as compared to the fabric according to this invention. This is attributed, at least in part, to the fact that the yarns arranged in one direction are four times as numerous as in either of the other two directions. Also, the weave is not such as to assure a positive interlock of yarns of all three axes where they intersect.

Therefore, objects of this invention are to provide a woven fabric which exhibits little or no structural weakness on the bias, to provide a wide variety of triaxial fabrics having an interlocking weave, fabrics having controllable characteristics, and to provide fabrics which are capable of being fabricated within a wide range of designs and parameters of strength, density, porosity and appearance.

Desirably, triaxial fabrics according to this invention are isotropic. This means a fabric which has strength and stiffness to resist stretching or shearing forces in the plane of the fabric regardless of the direction of force application. Normal fabrics, which are characteristically weak in the bias direction, are lacking in isotropy. The term "isotropy" applies also to a fabric's ability to resist shearing forces. It is an important feature of this invention, accordingly, that the number of yarns in any direction is not less than one-third of the number of yarns in any other direction.

Isotropy in a fabric is a desirable characteristic for many applications, such as curtains, blankets, mosquito netting, thermal underwear, girdles, bathing suits, sneakers, upholstery materials, inflatable space vehicles, balloons, airplane fabrics, Radomes, fuel cells, life rafts, parachutes, tire fabrics, gaskets, sails and reinforcing fabric in plastics and the like, for example.

Detailed description of the invention

The isotropic fabric produced by this invention is made by weaving some or all of three yarn course sets together in such a manner that the direction of each yarn *set* in the triaxial yarn system is arranged to form a predetermined angle with each other yarn *set*. Preferably, this angular relationship is about 60°. However, angles greater than about 10°–15° and angles less than 90° produce useful fabrics though they exhibit less isotropy.

Of course, it will be understood that when any yarn is woven over and under another, yarn curvatures are created as the yarn follows its tortuous path in the fabric. Such curvatures do allow limited stretching of the fabric by straightening out the curve, but the fabric is nevertheless "isotropic" within the definition of the word as intended herein.

In the weaves of the present invention, at least one and often all of the yarn [courses] *course sets* are woven such that the yarn course *set* is blocked from slippage along other yarn [courses] *course sets* angularly displaced therefrom by locking intersections of the angularly displaced yarn [courses] *course sets*. An intersecting-locking yarn course which passes over a second intersection-locking yarn course passes under the locked yarn course and vice versa. Such intersections alternate on either side of the locked course throughout its length. Because prevention of slippage of yarn courses in the plane of the fabric depends on the contiguity of the locked strand to the cross over point of the locking intersecting strands, the resistance of the fabric generally to slippage or distortion upon the application of shear forces depends on some degree of snugness between the locked and the locking yarn courses. Obviously this may vary depending on the characteristics desired in the finished product. Generally however, they will be relatively snugly compacted in order to take advantage of the locked intersections throughout the weave.

Such intersections also require that the materials used [b] *be* somewhat pliable and bendable or flaccid so that the locked yarn course can be contiguous with the locking yarn courses near their cross over point. Typical of the yarns which may be used for this purpose are cotton, wool, nylon, rayon and some of the more advanced yarns, such as "Thornel" graphite fiber made by the Union Carbide Corporation.

Referring now to the drawings, wherein distinguishing markings have been applied to yarns for convenience of illustration and differentiation:

In making reference to the yarns shown in all the drawings, the yarn depicted in solid black will be referred to as the woof or "z" yarn, the cross-hatched yarn as weft or "y" yarn and the stippled yarn as warp or "x" yarn. It will be understood, however, that depending upon the weaving technique, one or more yarns could be warp and one or more yarns filling.

Figure 1:
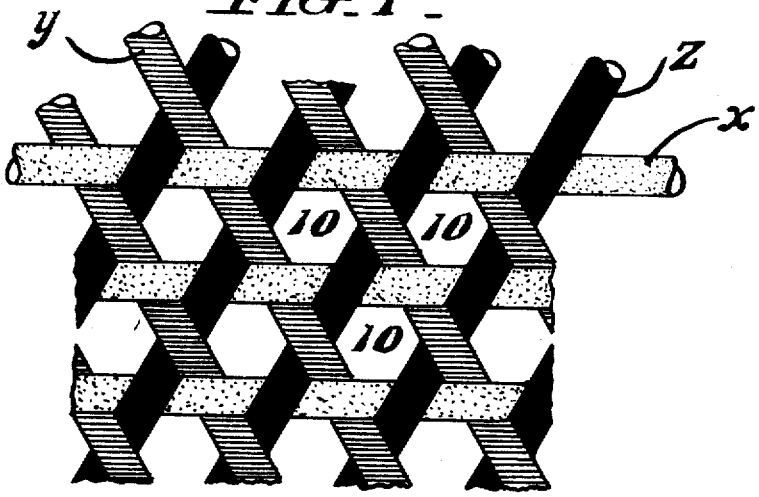
FIG. 1 is a face view of a simple triaxial fabric according to this invention.

The fabric shown in FIG. 1 is an illustration of a relatively simple woven isotropic fabric. In this fabric it is preferable (but not necessary) that yarns of the same diameter be chosen. The number 10 designates pores or open spaces in the fabric. Different yarn sizes could be used on each of the three axes of the fabric and the yarns may be packed more closely or more loosely than shown, depending upon the characteristics sought in the final fabric.

In FIG. 1 the distance between adjacent horizontal warp yarns x—x is roughly twice the diameter of the yarn, as is the distance between adjacent yarns y—y and z—z. The x yarn courses are woven over the y yarn courses and under the z yarn courses, the y yarn courses are woven over the z yarn courses and under the x yarn courses, and the z yarn courses are woven over x and under y. The resulting isotropic fabric has a density (mass per unit of area) of about one-half of that of a conventional biaxial loomed fabric having the same warp and woof composition; and a porosity of approximately 33⅓% in the same area, about 66⅔% of the projected area being occupied by yarn. But porosity is present in this form, regardless of the sizes of the three yarns or how tightly they are packed.

It is a characteristic of the weave appearing in FIG. 1 that at approximately this density and porosity all yarns are compacted snugly at each intersection of the yarns such that the possibility of slippages between adjacent yarns is minimized and an inherently stable configuration is achieved.

Figure 2:
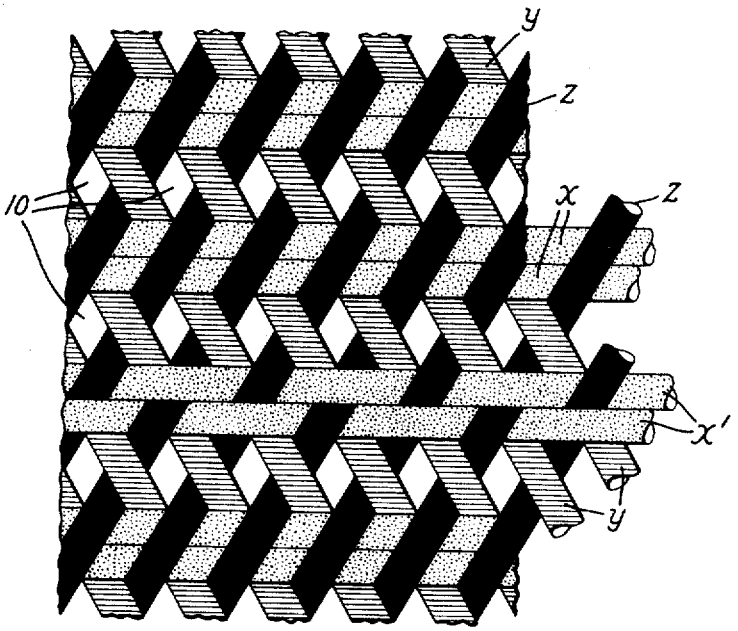
FIGS. 2–12 and 14–15 are face views of numerous variants of this invention.

In the fabric variation illustrated in FIGURE 2, it will be observed that, for convenience of fabric design, two "x" yarn strands are shown in a tight, side-by-side arrangement. Throughout the disclosure of this specification, I refer to a "yarn course" as meaning one yarn strand or a plurality of yarn strands which are tightly laid or twisted together so that they contact each other along substantially their entire length and function as a unit in the finished fabric. This is to be distinguished sharply from two parallel, spaced-apart yarn strands.

In FIG. 2 each yarn course x intersects each yarn course z at an angle of 60° and passes under all z yarns; each x yarn course intersects each y yarn course at an angle of 60° and passes over all y yarns, and each z yarn course passes (also at an angle of 60°) over one y yarn and under one y yarn. Each z yarn is over x. As shown, each x yarn course comprises a pair of adjacent parallel yarn strands which increases the density of the fabric to approximately 75% and reduces the porosity to about 12.5%. While in some cases the fabric may have excellent quality and porosity characteristics without this pairing, it is often preferred to provide paired strands as one of the yarn courses in an essentially straight longitudinal configuration, as illustrated in FIGURE 2. Here again, the yarn intersections are anchored, giving an inherently stable configuration.

In weaves such as that shown in FIGURE 2, some yarn courses such as those in the x direction in FIGURE 2 are uncrimped, i.e. they remain over all y courses and under all z courses throughout the weave. To preclude the possibility of such uncrimped yarn courses sliding horizontally (as illustrated) through the fabric, selected yarn courses in the uncrimped yarn course direction, disposed at intervals in the fabric, may be interwoven with one or both of the non-parallel yarn courses. In FIGURE 2, one pair of yarn courses $x^1$ is interwoven with the z yarn courses in just such a manner.

Figure 3:
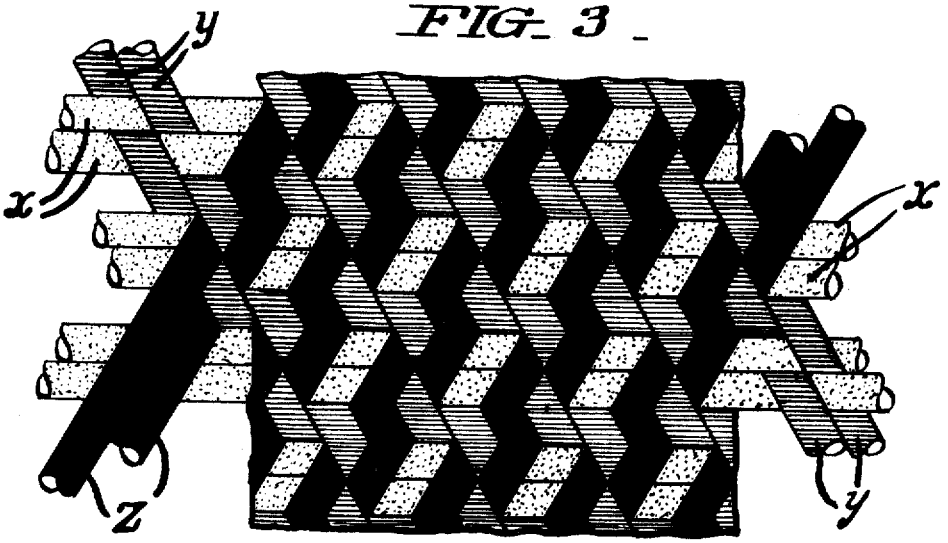

The triaxial fabric of FIG. 3 has essentially no porosity and has a density of approximately 100%. It is characteristic of this fabric (as well as others heretofore described) that this fabric has anchored intersections and that there is substantially no slippage between yarns at their intersections. The yarn axes intersect at an angle of 60°. Each x yarn course passes under all z yarn courses; each x yarn course passes over one y yarn course and under one y yarn course; and each z yarn course passes over one y yarn course and under one y yarn course.

With respect to the fabric shown in FIGURE 3, as well as several others described herein, it may be noted that two of the parallel sets of yarn courses, x and z in FIGURE 3, are not interwoven with one another. Thus throughout the fabric shown in FIGURE 3 x yarn courses are under z yarn courses. Fabrics of this type are important because this characteristic facilitates the weaving process and simplifies the mechanics of the looms required to weave such fabrics.

Figure 4:
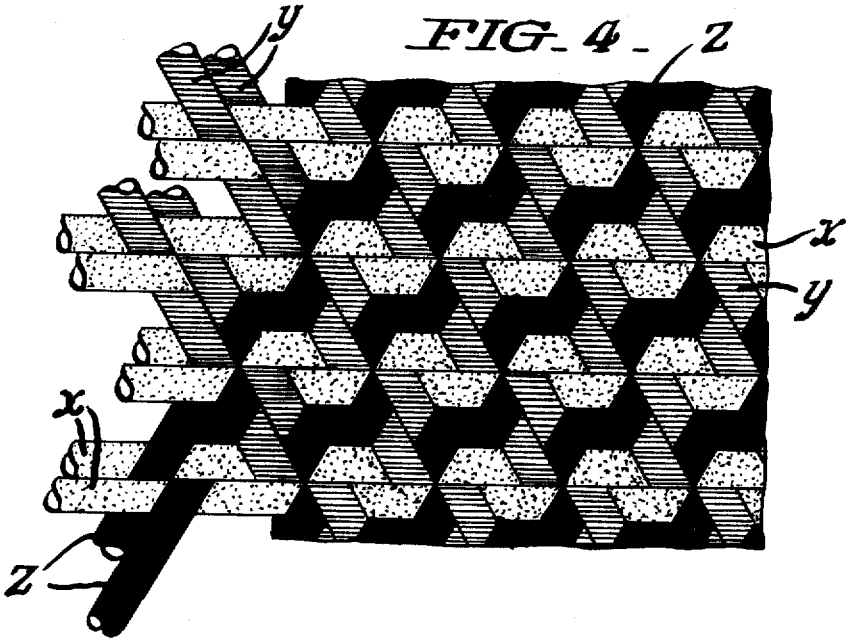

Referring now to FIGURE 4, the fabric there shown is characterized by its lack of porosity and nearly 100% density. Here again, the intersections are anchored. Each x yarn course passes under one and over one z yarn course; each x yarn course also passes over one and under one y yarn *course*. In addition, each z yarn course passes under one and over one y yarn course. Specifically, in the FIGURE 4 fabric, each x yarn course passes alternatingly over and under z and also alternatingly over and under y, each y yarn course passes alternatingly over and under x, and alternatingly over and under z, and each z yarn course passes alternatingly over and under x and alternatingly over and under y.

Figure 5:
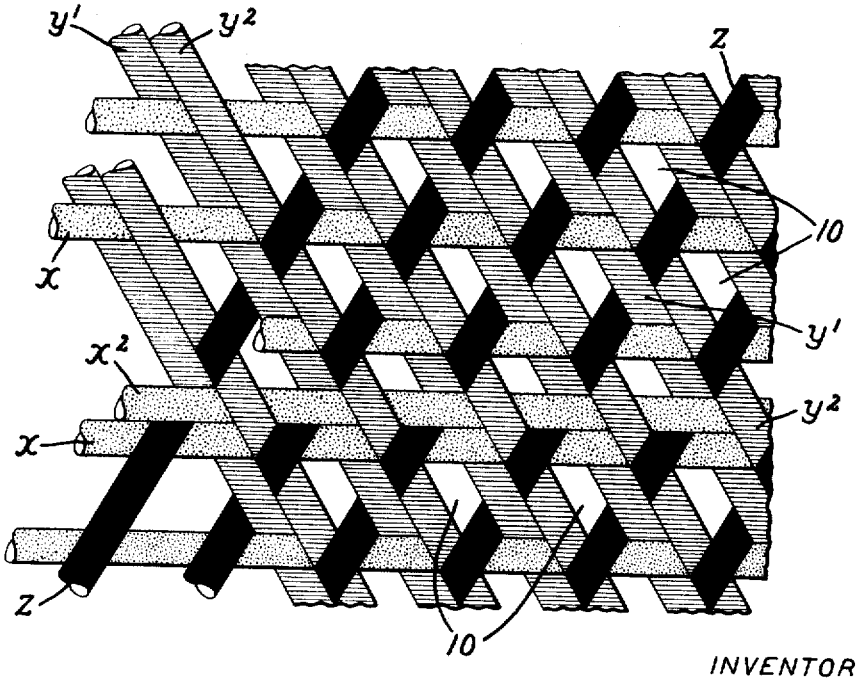

Certain modifications in the composition of the yarn axes illustrated in FIGURE 1 were made, resulting in the highly porous weave shown in FIGURE 5. In FIGURE 5 the x and z yarn courses contain only one yarn each while the y yarn axis contains two yarns $y^1$ and $y^2$. Yarns $y^2$ are "floating" yarns, remaining over all x yarns and under all z yarns. Within the framework of this modification, the relationships for the FIG. 1 fabric still hold true; FIG. 5 fabric is the equivalent of FIG. 1 with an extra y yarn. In FIG. 5, specifically the y yarn courses are in pairs $y^1$ and $y^2$, and $y^1$ is under all x and over all z, while $y^2$ is over all x and under all z, each z yarn course is alternately over and under $y^1$ and $y^2$ and is over all x, and each x yarn course is alternately over and under $y^1$ and $y^2$, and is under all z.

Figure 6:
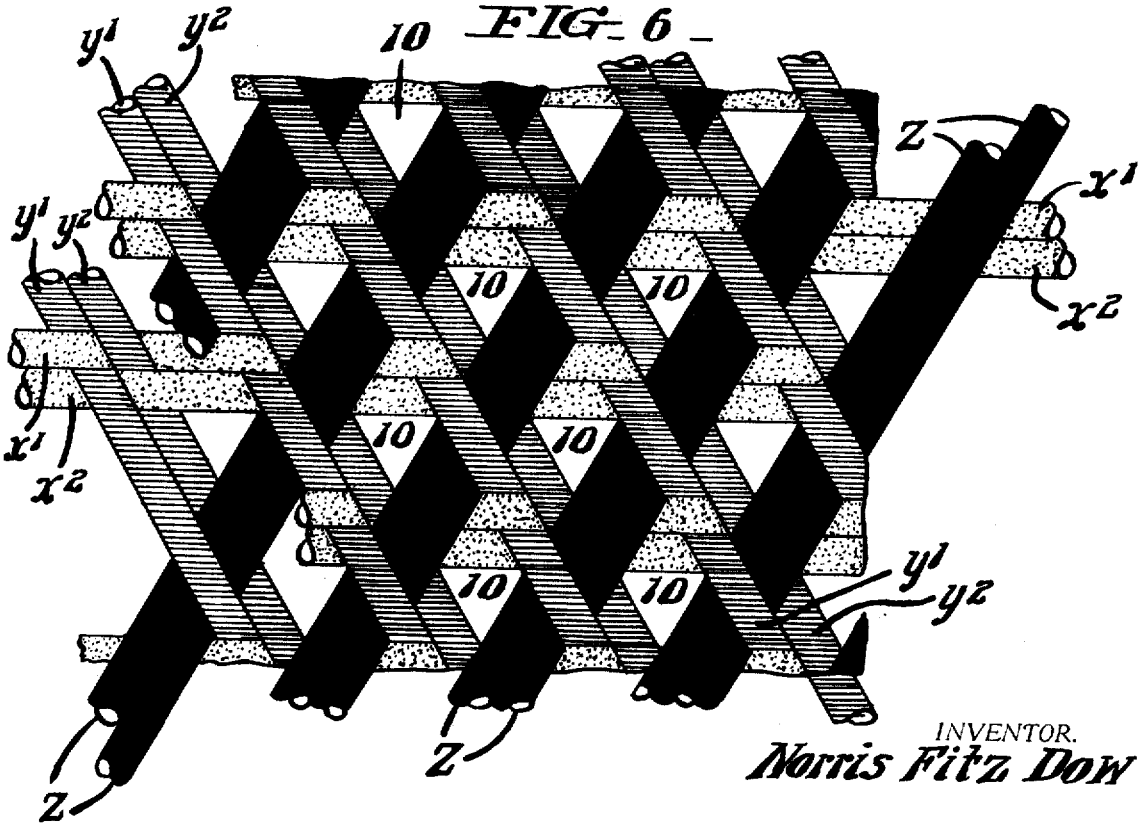

Similarly, the modification appearing in FIG. 6 shows another decorative fabric which is within the scope of this invention. Here the z yarn axis contains two yarns both arranged over one y yarn and under the adjacent y yarn, over the x yarns; the x yarns are over one y yarn and under the adjacent y yarn. Specifically, the x yarn courses are in pairs $x^1$ and $x^2$, $x^1$ being under all z and alternatingly over and under all y, $x^2$ being under all z and, in opposite phase to $x^1$ alternatingly over and under all y, the y yarn courses are in pairs $y^1$ and $y^2$, $y^2$ being under all z and alternatingly, in opposite phase to $y^1$, over and under x, and the z yarn courses are over all x and alternatingly over and under y.

The stability, i.e. resistance to slippage, in weaves having some "floating" yarn courses, such as $y^2$ in FIGURES 5 and 6, may be enhanced by either regularly or periodically interweaving a locking strand at intervals in the fabric. In FIGURE 5, for example, an additional yarn course $x^2$ is interwoven over all z yarns instead of under all z yarns to control slippage of "floating" yarn course $y^2$.

Figure 7:
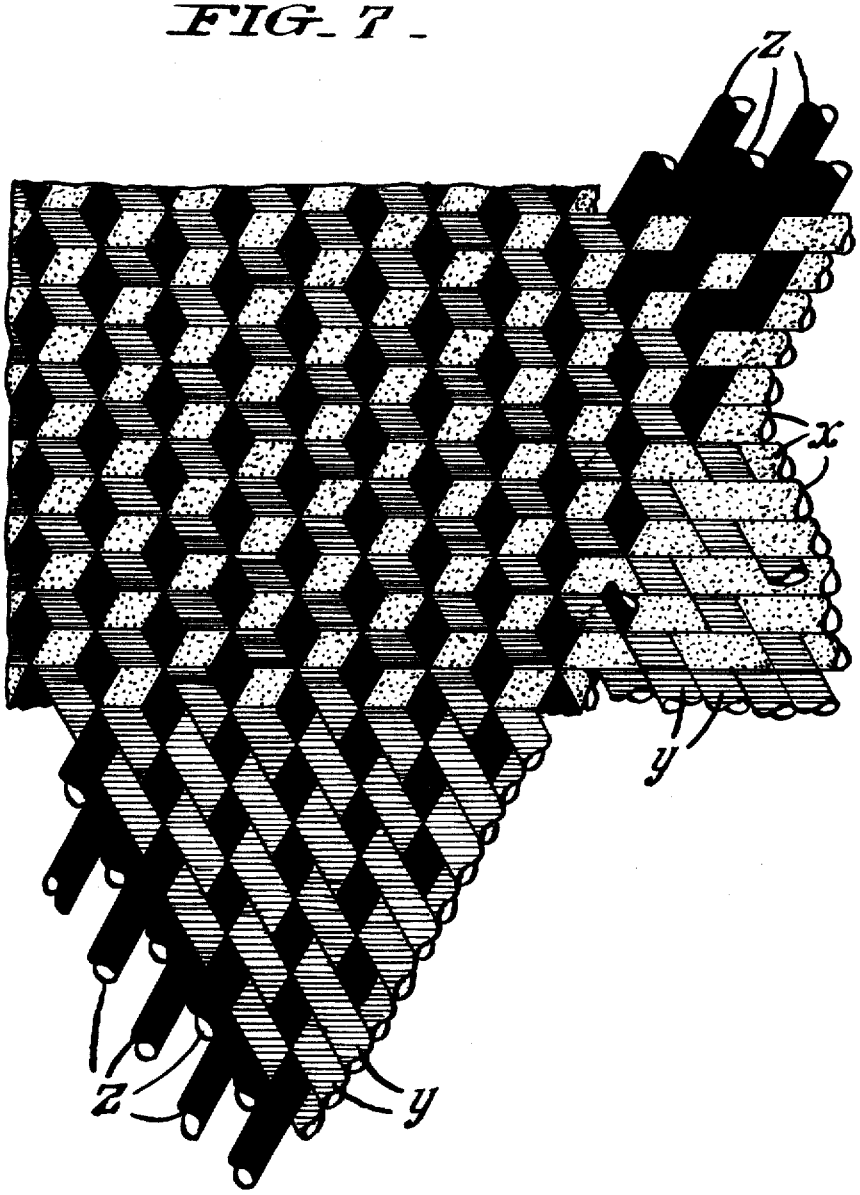

FIGURE 7 shows another isotropic fabric variation having no porosity and a density of 150% because of yarn overlay. In this fabric the yarn axes are again at 60° for the preferred isotropy. The x yarn *course* is characterized by passing under two over one z yarn *courses* and under one and over two y [yarns] *yarn courses*. Further, each z yarn *course* passes under two and over one y yarn *course*.

In the FIG. 7 form, the x yarn course passes under two z and over one z, and under one y and over two y, the y yarn course passes over one x and under two x, and over two z and under one z, and the z yarn courses passes under two y and over one y, and under one x and over two x. The resulting fabric is extremely strong, making it ideally suited for use in demanding applications as for sails and the like.

Figure 8:
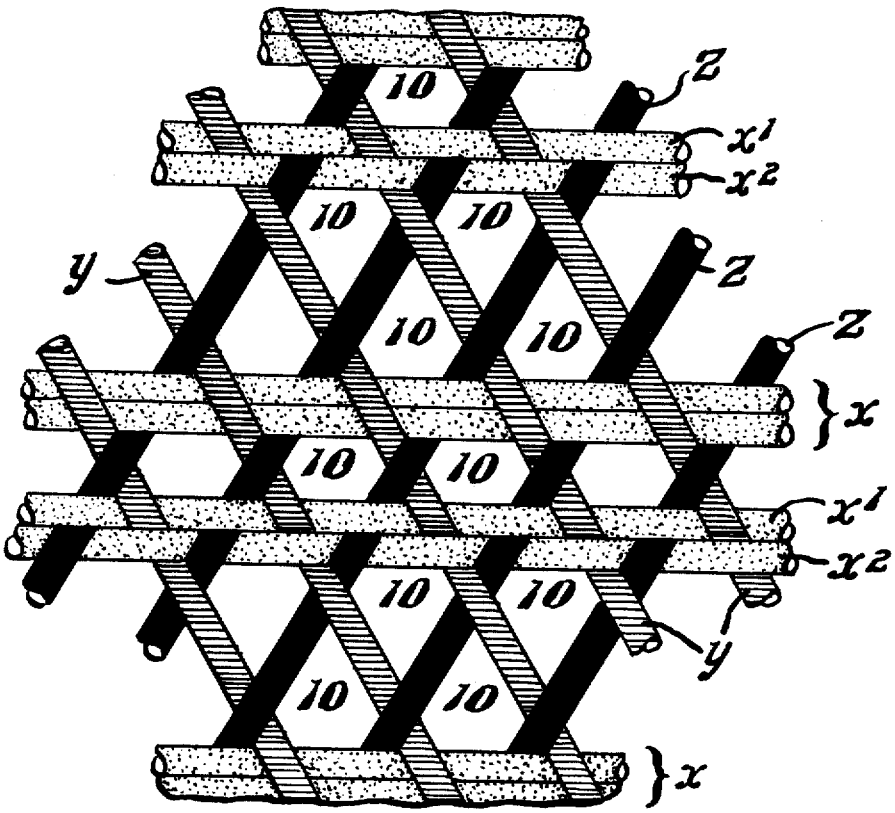

FIG. 8 shows a fabric having great porosity, where a yarn course x and another yarn course $x^1$, $x^2$ and provided alternately. The x yarn course passes over all z and under all y, $x^1$ is alternately under y and over z, $x^2$ is alternately over y and under z, the y yarn course passes over all x and over $x^1$ and under $x^2$ and is under two z and over one z. The z yarn course passes under all x, under $x^1$ and over $x^2$, and over two y and under one y. This weave, again, exhibits the intersection-locking feature which is considered important and advantageous.

Figure 9:
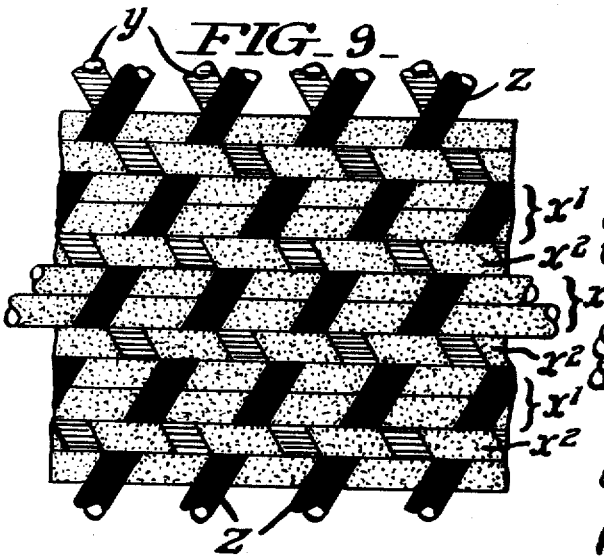

FIG. 9 represents a low-density, closely woven fabric according to this invention. Because of close packing, porosity is substantially zero, yet all filaments are securely anchored in position. There are no sets of parallel filaments which are not stabilized by crossing filaments, as there would be in a two-way weave closely packed in one direction and loosely packed, for density reduction, in the other direction.

Specifically in FIG. 9, two x yarn courses $x^1$ and $x^2$ are provided; $x^1$ is under all z and over all y while $x^2$ is over z and under y, y is under $x^1$ and over $x^2$, and under z, and z is over $x^1$ and under $x^2$, and over y. The density is 83.3% of a closely woven two-way weave and the maximum stiffness in the x direction is 200% more than in the y and z directions. Of course, other densities can be attained by variations in the weaving pattern. The embodiment shown in FIG. 9 is especially useful because it has a density below 100% of a closely woven two-way fabric and achieves this without porosity or loss of the important anchored-filament feature.

Figure 10:
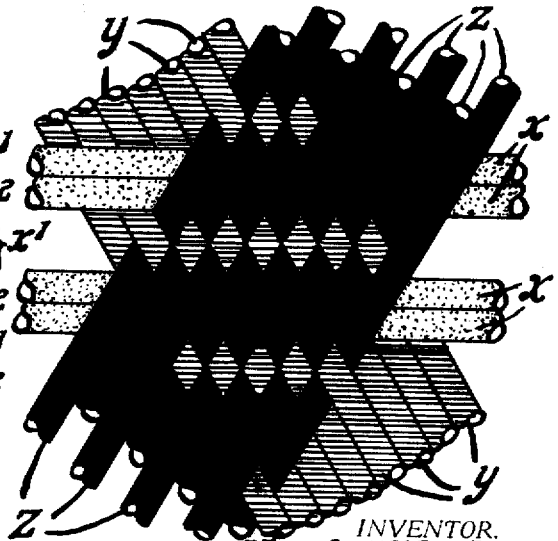

FIG. 10 represents a twill fabric according to this invention wherein one element of the weave is completely concealed. This weave has the characteristic of anchored intersections, as heretofore discussed, and has zero porosity. The x [yarns] *yarn courses* in the weave are under all z [yarns] *yarn courses* and over all y. The z [yarns] *yarn courses* are over all x, and are over three y and under one y. The y [yarns] *yarn courses* are under all x, and are over one z and under three z. This yarn has a density of approximately 152% of closely woven two-way weave, and has a minimum stiffness in the x direction (50% less than in the y and z directions). Again, this example is representative only since other densities and directional stiffness ratios are readily accessible by variations in the weaving pattern while maintaining complete coverage of one of the three weaving elements.

Figure 11:
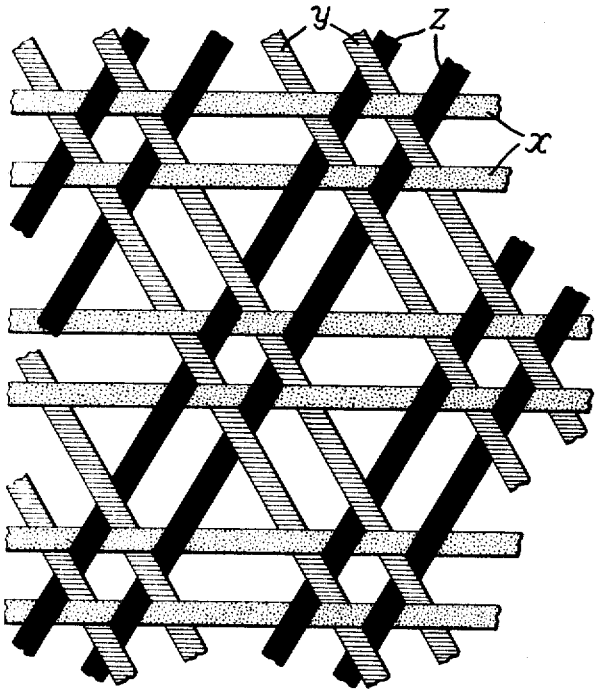

In FIGURE 11 is shown a weave variant differing from that shown in FIGURE 1 by the omission of selected yarn courses.

Specifically, the FIGURE 11 weave is made in the same way as the FIGURE 1 weave but every third yarn course in each of the three yarn course directions is omitted. The result is a high porosity fabric comprising a multiplicity of parallel pairs of yarn courses in each of three yarn course directions, the distance between the two yarns courses of each pair being approximately twice the diameter of the yarn courses. In this fabric, like that of FIGURE 1, all of the x yarn courses are woven over all of the y yarn courses and under the z yarn courses, the y yarn courses are woven over the z yarn courses and under the x yarn courses, and the z yarn courses are woven over x and under y.

The distance between parallel pairs of yarn courses shown in FIG. 11 is 2.5 times that between the two yarn courses of the yarn course pairs. Stable open weaves of even greater porosity may be produced by expanding this interpair spacings so that it is more than the inter-pair spacing shown. For example, if the inter-pair spacing is four times the intra-pair spacing, the fabric is characterized by even higher porosity and lower density (on the order of 20%). All of these high porosity weaves may be used as scrim or decorative fabrics, or for other applications in which stable, open woven fabrics are required.

Figure 12:
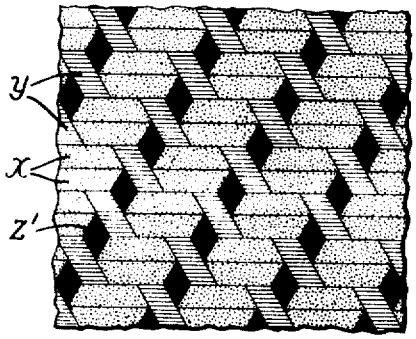
Figure 13:
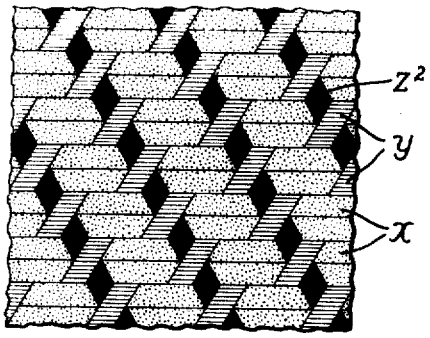
FIG. 13 is a reverse view of the variant shown in FIG. 12.

In FIGURE 12 is shown a non-porous, high density, triaxial fabric with locked intersections construction which may be more easily manufactured than some of those heretofore described. This manufacturability results because of the presence therein of uncrimped yarn courses appearing on opposite faces of the fabric. More specifically there is shown a fabric in which the x yarn courses, each comprising a pair of parallel, adjacent strands, are disposed under all $z^1$ yarn courses and over all $z^2$ yarn courses. All y yarn courses are disposed over all $z^1$ yarn courses, under all $z^2$ yarn courses and alternatingly over and under successive x yarn courses. It will be noted by reference to FIGURE 12 and to FIGURE 13, which shows the reverse side of the fabric shown in FIGURE 13, and the $z^1$ yarn courses are visible only on one side of the fabric and the $z^2$ yarn courses are visible only on the other side of the fabric. Because both of the z yarn courses form locked intersections blocking slippage of x and y yarn courses throughout the weave, part or all of either of the z yarn courses may be omitted for decorative effect or to obtain particular mechanical characteristics without imparting the stability of the weave.

For some applications, such as composite material reinforcement, isotropic fabrics having relatively long lengths or "floats" of unwoven materials are desirable. Embodiments of the present invention having such characteristics are seen in FIGURES 14 and 15.

Figure 14:
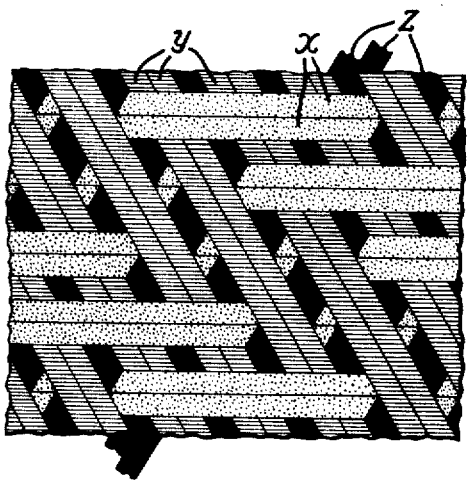

In FIGURE 14, there is shown a fabric in which a first set of parallel yarn courses y are disposed throughout the fabric over those of a second set z. A third set x alternately passes under a plurality of consecutive intersecting z and y yarn courses and over a succeeding plurality of consecutive intersecting z and y yarn courses. In the weave of FIGURE 14, in which each of the pluralities of consecutive intersecting z and y yarn courses comprises three such intersections, only half of the z yarn courses are locked, i.e. blocked from slippage along intersecting yarn courses by locked intersection construction as described previously, whereas, as shown, all x and y yarn courses are locked.

While a less than completely stabilized fabric, such as that shown in FIGURE 14, is relatively easily woven and may have particular utility for some applications, a need is foreseen for triaxial isotropic weaves with long floats of unwoven material and locked intersection construction throughout. A weave of the latter type, with all yarn courses blocked from slippage along other yarn courses is seen in FIGURE 15.

Figure 15:
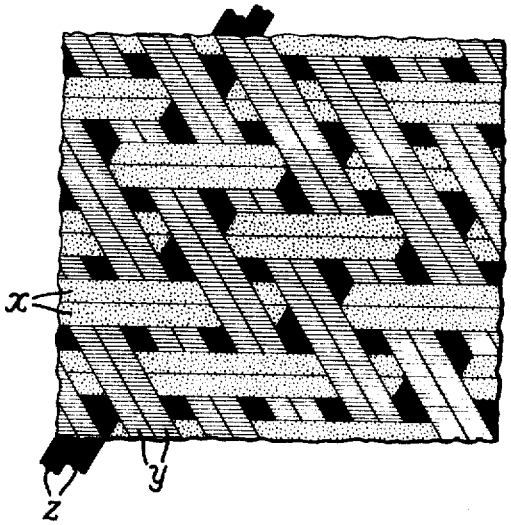

The weave shown in FIGURE 15 is characterized as follows: all y yarn courses are disposed over all z yarn courses; each x yarn course follows a sequential path as follows, (1) under y, over z (2) over y and z (3) over y and z (4) under y, over z (5) under y and z (6) over y and z (7) over y and z (8) under y and z and (9) under y, over z; and each y yarn course follows a sequential path, with respect to x yarn courses, as follows (1) over two x (2) under two x (3) over three x and (4) under two x.

Since the number of parameters governing the isotropic fabrics according to this invention is greater than the conventional biaxial fabric, the number of variations in fabric properties both physical and decorative or ornamental is vastly increased over those possible with conventional fabrics. For example, each yarn axis may contain various thread compositions having varying properties and sizes. By adjustment of these variables, a wide variety of predetermined characteristics may be designed into the resultant isotropic fabrics.

While in this specification and in the claims reference is made to "yarn courses passing alternately," it is not intended to be limited unless otherwise specified, to a one-by-one alternation or to an alternation involving any specific numbers, since it will be apparent that various alternations whether regular or irregular may be substituted for those specifically shown in the drawings as examples of fabrics constructed in accordance with this invention. It is to be emphasized that the specific fabrics that have been selected for illustration in the drawings are illustrative only and are not intended to limit the scope of the invention as set forth in the appended claims.

Although the fabric according to this invention has been described with reference to specific embodiments thereof, it will be readily apparent that these disclosures are exemplary and that the invention is capable of variations in producing a wide variety of unique fabrics, all within the spirit and scope of the invention as defined in the appended claims.

The following is claimed:

1. A triaxial pliable fabric comprising three sets of parallel woven yarn courses x, y and z, each set having an axis disposed at an acute angle with each other axis, the number of yarns in each set being more than one-third of the number of yarns in each other set, the yarn [course] *courses* of at least one of said sets, the locked yarn course *set* being woven with respect to *the yarn courses of* each of the other two sets, the locking yarn courses, in a manner to provide an interlock among the respective yarn courses, said interlock being constructed and arranged to prevent sliding of the locked yarn [course] *courses* along the locking yarn courses at the intersections thereof and being formed of spaced-apart snugly compacted yarn intersections which resist yarn course displacement of the locked yarn [course] *courses* in opposed directions.

2. The fabric defined in claim 1 wherein each x yarn course is over y and under z, each y is under x and alternating over and under z, and each z yarn is alternatingly over and under y and over x.

3. The fabric defined in claim 1 wherein each x yarn course passes under all z yarn courses, and alternatingly over and under y, each y yarn course passes alternatingly over and under x, and alternatingly over and under z, and each z yarn course passes alternatingly over and under y and over x.

4. The fabric defined in claim 1 wherein each x yarn course passes alternating over and under z and also alternatingly over and under y, each y yarn course passes alternatingly over and under x, and alternatingly over and under z, and each z yarn course passes alternatingly over and under x and alternatingly over and under y, and wherein each yarn course is a yarn pair where each yarn of the pair alternates with the other.

5. The fabric defined in claim 1 wherein the y yarn courses are in pairs $y^1$ and $y^2$, and $y^1$ is under all x and over all z, while $y^2$ is over all x and under all z, each z yarn course is alternately over and under $y^1$ and $y^2$ and is over all x, and each x yarn course is alternately over and under $y^1$ and $y^2$, and is under all z.

6. The fabric defined in claim 1 wherein the x yarn courses are in pairs $x^1$ and $x^2$, $x^1$ being under all z and alternatingly over and under all y, $x^2$ being under all z and, in opposite phase to $x^1$, alternatingly over and under all y, the y yarn courses are in pairs $y^1$ and $y^2$, $y^1$ being over all z and alternatingly over and under x, $y^2$ being under all z and alternatingly, in opposite phase to $y^1$, over and under x, and the z yarn courses are over all x and alternatingly over and under y.

7. The fabric defined in claim 1 wherein all of the courses are intermingled such that at some points on the fabric a thickness of all three yarn courses is presented.

8. The fabric defined in claim 1 wherein the x yarn course passes under two z and over one z, and under one y and over two y, the y yarn course passes over one x and under two x, and over two z and under one z, and the z yarn course passes under two y and over one y, and under one x and over two x, the fabric having a density of over 100% of the density of a closely woven two-way fabric composed of identical yarns.

9. The fabric defined in claim 1 wherein x is provided in alternate, different yarn courses, the first course comprising x which is over all z and under all y, the second course comprising alternating pairs $x^1$, $x^2$ each alternatingly over and under y and z but $x^1$, $x^2$ being out of phase with each other, y is over x, over $x^1$ and under $x^2$, and is over one z and under two z, and z is under x, under $x^1$ and over $x^2$, and is over two y and under one y, the fabric having a porosity of at least about 33⅓% and all yarn courses being locked against relative motion.

10. The fabric defined in claim 1 wherein two x yarn courses $x^1$ and $x^2$ are provided; $x^1$ is under all z and over all y while $x^2$ is over z and under y, y is under $x^1$ and over $x^2$, and under z, and z is over $x^1$ and under $x^2$, and over y, such fabric being substantially free of gaps inherently provided by the weave and having a density of less than 100%.

11. The fabric defined in claim 1 wherein the x yarn [course is] *courses are* over all y and under all z, the y yarn [course] *courses* [is] *are* under x, and over one z and under three z, and the z yarn [course is] *courses are* over all x, and over three y and under one y, the x yarn [course] *courses* being completely concealed within the y and z yarn courses.

12. The triaxial fabric of claim 1, wherein the spaced-apart yarn intersections of said interlock are comprised of a locking yarn course which crosses over a second locking yarn course and then under a locked yarn course, and said second locking yarn course crosses over said locked yarn course, said cross over of said locking yarn courses being contiguous with the locked yarn course.

13. The triaxial fabric of claim 1, wherein [substantially all of said] *each of the* yarn courses in all three of said sets are woven with [said] *the yarn courses of the* remaining sets *with which they intersect* to form interlocks, as described, which prevent each of the three of said sets of parallel woven yarn courses from sliding along yarn courses angularly displaced therefrom.

14. The fabric defined in claim 1 wherein said fabric is essentially nonporous.

15. The fabric defined in claim 1 wherein two of said parallel yarn course sets are not interwoven with one another.

16. The triaxial fabric of claim 1, wherein at least one of said sets of parallel yarn courses, an uncrimped yarn course set, remains, throughout most of the fabric, over one of said angularly displaced sets and under the other of said angularly displaced sets, said uncrimped yarn course set having, at intervals in the fabric, a limited number of yarn courses interwoven with said angularly displaced sets of yarn courses such that it is not always over one of said sets and always under the other of said sets.

17. The triaxial fabric of claim 1, wherein one set of parallel yarn courses, a floating yarn course *set*, is not blocked from slippage along yarn courses angularly displaced therefrom by locking intersections formed of said angularly displaced yarn courses, and incorporated at intervals in said weave, a yarn course angularly displaced from said floating yarn courses, so interwoven with said floating yarn courses and the other angularly displaced yarn courses as to inhibit slippage of said floating yarn courses.

18. The triaxial fabric of claim 1, including paired parallel yarn courses $z^1$ and $z^2$ in the z direction wherein all x yarn courses are disposed under all $z^1$ yarn courses and over all $z^2$ yarn courses and all y yarn courses are disposed over all $z^1$ yarn courses, under all $z^2$ yarn courses and alternatingly over and under successive x yarn courses.

19. The triaxial fabric of claim 1 wherein y yarn courses are disposed over z yarn courses and x yarn courses alternately pass under a plurality of consecutive intersecting y and z yarn courses and over a succeeding plurality of consecutive intersecting y and z yarn courses.

20. The triaxial fabric of claim 1 wherein all y yarn courses are disposed over all z yarn courses; each x yarn follows a sequential path as follows: (1) under y, over z (2) over y and z (3) over y and z (4) under y, over z (5) under y and z (6) over y and z (7) over y and z (8) under y and z and (9) under y, over z; and each y yarn course follows a sequential path, with respect to x yarn courses, as follows (1) over two x (2) under two x (3) over three x and (4) under two x.

21. The triaxial fabric defined in claim 1 wherein the x yarn courses are woven under z yarn courses and over y yarn courses, and the z yarn courses are woven over x and under y yarn courses.

22. The triaxial fabric defined in claim 21 wherein said yarn courses are of about equal diameter and are equally spaced from neighboring parallel yarn courses, the distance between said neighboring parallel yarn courses being about twice the diameter of said yarn courses.

23. The triaxial fabric defined in claim 21 wherein said yarn courses are of about equal diameter and form pairs of parallel spaced apart yarn courses, the distance between members of said pairs being twice the yarn course diameter.

References Cited

The following references, cited by the Examiner, are of record in the patented file of this patent or the original patent.

UNITED STATES PATENTS

| | | | |
|---|---|---|---|
| 1,603,982 | 10/1926 | Riley | 139—28 |
| 1,368,215 | 2/1921 | Stewart | 139—419 |
| 1,955,986 | 4/1934 | Tice, Jr. | 139—419 X |
| 104,243 | 6/1870 | Wright | 139—420 |
| 1,033,843 | 7/1912 | Trautvetter | 139—419 |
| 1,201,257 | 10/1916 | Cobb | 139—DIG. 1 |
| 1,367,751 | 2/1921 | Morris | 139—419 |
| 2,985,941 | 5/1961 | Riedesel et al. | 139—383 X |

FOREIGN PATENTS

| | | | |
|---|---|---|---|
| 879,838 | 12/1942 | France | 139—383 |
| 367,873 | 2/1932 | Great Britain | 139—424 |
| 14,098 | 1892 | Great Britain | 139—DIG. 1 |

OTHER REFERENCES

*Encyclopedia of World Art*, McGraw-Hill Book Co., Inc., Vol. 2, col, 387–400, "Basketry."

*Mechanical Engineering*, June 1959, p. 121.

JAMES KEE CHI, Primary Examiner

U.S. Cl. X.R.

139—419, DIG. 1

UNITED STATES PATENT OFFICE

CERTIFICATE OF CORRECTION

Patent No. RE 28155 Dated Sept. 10, 1974

Inventor(s) N.F. Dow

It is certified that error appears in the above-identified patent and that said Letters Patent are hereby corrected as shown below:

Col. 5, line 13, change "courses" to --course--.

Col. 5, line 58, change "152%" to --125%--.

Col. 6, line 37, change "imparting" to --impairing--.

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*